United States Patent
Park et al.

(10) Patent No.: US 8,462,692 B2
(45) Date of Patent: Jun. 11, 2013

(54) SYSTEM AND METHOD FOR REASSEMBLING PACKETS IN RELAY NODE

(75) Inventors: Ji-Soo Park, Daejeon-si (KR);
Cheol-Hye Cho, Daejeon-si (KR);
Sung-Hee Kim, Daejeon-si (KR);
Yeong-Jin Kim, Daejeon-si (KR);
Young-Jick Bahg, Daejeon-si (KR)

(73) Assignees: Samsung Electronics Co., Ltd., Suwon-si (KR); Electronics and Telecommunications Research Institute, Dajeon (KR)

( * ) Notice: Subject to any disclaimer, the term of this patent is extended or adjusted under 35 U.S.C. 154(b) by 268 days.

(21) Appl. No.: 12/744,915

(22) PCT Filed: Jul. 16, 2008

(86) PCT No.: PCT/KR2008/004167
§ 371 (c)(1),
(2), (4) Date: May 26, 2010

(87) PCT Pub. No.: WO2009/069874
PCT Pub. Date: Jun. 4, 2009

(65) Prior Publication Data
US 2010/0302997 A1    Dec. 2, 2010

(30) Foreign Application Priority Data
Nov. 30, 2007    (KR) .................. 10-2007-0123864

(51) Int. Cl.
*H04B 7/14*    (2006.01)

(52) U.S. Cl.
USPC ........................................................ 370/315

(58) Field of Classification Search
USPC ......... 370/203, 204–215, 229–240, 241–253, 370/310–337, 338–350, 395.1, 395.3, 395.4, 370/395.41, 395.42, 395.5, 395.52, 395.53, 370/412–421, 431–457, 458–463, 464–497, 370/498–522, 521–529
See application file for complete search history.

(56) References Cited

U.S. PATENT DOCUMENTS

| 5,699,367 | A * | 12/1997 | Haartsen ...................... 714/749 |
| 5,987,034 | A | 11/1999 | Simon et al. |
| 6,967,964 | B1 * | 11/2005 | Svanbro et al. ............... 370/437 |
| 7,359,983 | B1 * | 4/2008 | Maufer et al. ................ 709/236 |
| 7,391,778 | B2 | 6/2008 | Oh |
| 2002/0097723 | A1 * | 7/2002 | Tourunen et al. ............. 370/392 |
| 2004/0210669 | A1 | 10/2004 | Lee |
| 2004/0221074 | A1 | 11/2004 | Horton et al. |
| 2006/0050738 | A1 | 3/2006 | Carr et al. |

(Continued)

FOREIGN PATENT DOCUMENTS

| KR | 10-2004-0073886 A | 8/2004 |
| KR | 10-2004-0080662 A | 9/2004 |
| KR | 10-2005-0057832 A | 6/2005 |
| WO | 93/19544 A1 | 9/1993 |

*Primary Examiner* — Jung-Jen Liu
(74) *Attorney, Agent, or Firm* — Jefferson IP Law, LLP (57) ABSTRACT

A system and method for reassembling packets in a packet relay node are provided. A packet relay node located between a transmitting node (i.e., a source node) and a receiving node (i.e., a destination node) inspects received packets to see if they are fragmented packets and reassembles a series of packets decided to be fragmented packets into an original packet, thereby reducing overhead and radio resource waste caused by duplicate transmission of IP headers having the same fragmented-packet information.

17 Claims, 8 Drawing Sheets

U.S. PATENT DOCUMENTS

| | | | |
|---|---|---|---|
| 2007/0076625 A1* | 4/2007 | Tahara et al. | 370/252 |
| 2007/0274342 A1* | 11/2007 | Kim et al. | 370/473 |
| 2008/0137586 A1* | 6/2008 | Jones et al. | 370/315 |
| 2008/0273524 A1* | 11/2008 | Tenny et al. | 370/352 |
| 2010/0302997 A1* | 12/2010 | Park et al. | 370/315 |

* cited by examiner

SYSTEM AND METHOD FOR REASSEMBLING PACKETS IN RELAY NODE

TECHNICAL FIELD

The present invention relates to a system and method for reassembling packets in a packet relay node, and more particularly, to a technique of processing packets in a packet relay node located between a source node and a destination node.

This work was supported by the IT R&D program of Ministry of Information and Communication (MIC)/Institute for Information Technology Advancement (IITA) [2005-S-404-23, Research and development on 3G long-term evolution access system].

BACKGROUND ART

For the purpose of successively transmitting large sized data on an IP network, one IP node fragments data into successive IP packets and transmits the successive IP packets to another node.

The length of a packet that can be transmitted between a source node and a destination node at one time is called a Maximum Transfer Unit (MTU). In the above method, when IP packets, each including a payload, transmitted and received between nodes are larger than the MTU, each payload is fragmented into several pieces. An IP layer fragments the packets according to an MTU of a physical network in a transmission section.

In a conventional technique, a packet relay node, such as a router, located between a transmitting node (i.e., a source node) and a receiving node (i.e., a destination node) does not reassemble fragmented IP packets, which will be reassembled by an IP layer of the destination node.

In view of efficiency of message management, some layers, such as a TCP layer, usually fragment packets using an entire size of an MTU and transmit fragmented packets to the IP layer. However, on a layer such as a User Datagram Protocol (UDP), IP may fragment a payload having a maximum of 65,536 bytes size provided by an upper application layer in consideration of the MTU in order to transfer the payload to the IP layer, if necessary.

A difference in fragmentation between IPv4 and IPv6 is that only an IPv6 source node is allowed to perform fragmentation with a Fragment Header (FH) that is an IPv6 extension header being added and used for identifying fragmented packets while routers on a packet transmission path are not allowed to perform the fragmentation.

Figure 1:
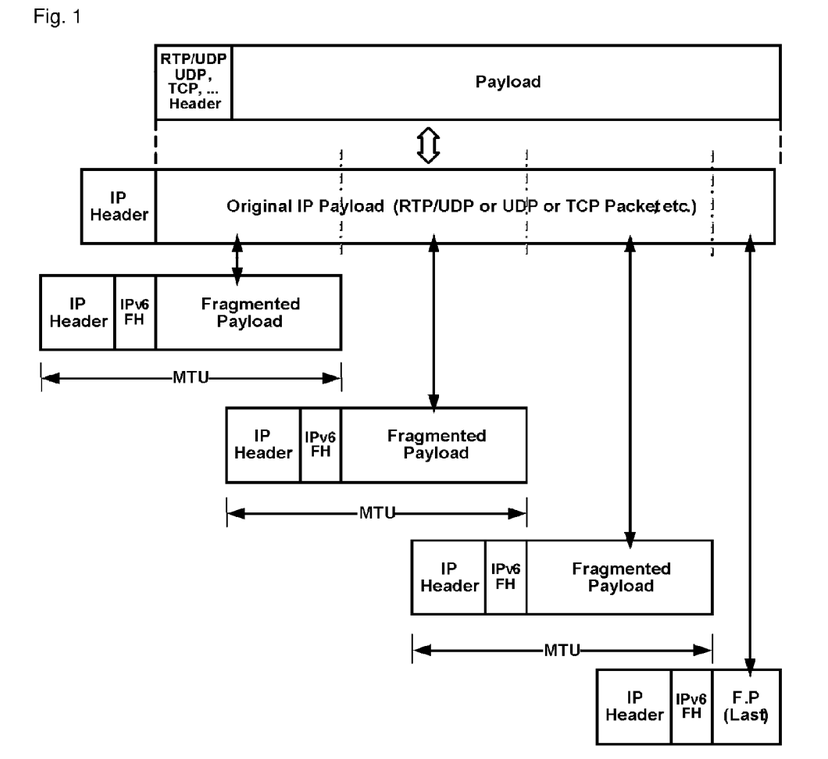
- FIG. 1 illustrates an overview of packet fragmentation.

FIG. 1 illustrates an example in which a payload of each of several types of packets, such as Real-Time Transport Protocol (RTP)/User Datagram Protocol (UDP)/Internet Protocol (IP), UDP/IP and TCP/IP packets, having a greater size than an MTU, is fragmented, and the resultant fragmented packets are assembled back into an original packet. Referring to FIG. 1, only a first fragmented packet including a header, such as an RTP/UDP/IP, UDP/IP or TCP/IP packet, satisfies a header compression profile of a Packet Data Convergence Protocol (PDCP) entity, and other fragmented packets all have a type of IP packets merely carrying a payload of an upper layer.

This means that only the first fragmented packet satisfies the header compression profile previously set in the PDCP entity and other fragmented packets are transmitted without satisfying the header compression profile set in the PDCP entity. In this case, the FH is located between the IP header of each fragmented packet and the payload of an original packet.

Accordingly, when the fragmented IP packets are received by the PDCP entity via a PDCP Service Access Point (SAP), radio resources are wasted due to duplicate transmission of IP headers having the same fragmentation information. Since the fragmented packets are transmitted without satisfying the header compression profile set in the PDCP entity, a header compression algorithm does not correctly operate and compression is not performed due to the presence of fragmented packets having a different profile from the header compression profile, leading to incorrect information exchange between header compression protocols and additional radio resource waste. The radio resource waste becomes severe for an IPv6 packet having a larger header.

Furthermore, when one piece of an IP packet having a fragmented payload among IP packets transmitted to user equipment is lost, all the IP packets must be retransmitted from the network. This causes heavy overhead on communication.

Thus, there is a need for an efficient method for resolving problems of low efficiency of header compression protocol, waste of radio resources, and packet transmission overhead.

DISCLOSURE OF INVENTION

Technical Problem

The present inventor has studied a packet processing technique in which fragmented packets are reassembled by a packet relay node for relaying packets rather than a destination node, in order to increase radio transmission efficiency by reducing overhead and radio resource waste caused by duplicate transmission of IP headers having the same fragmentation information.

The present invention provides a system and method for reassembling packets in a packet relay node for relaying packets in which fragmented packets are reassembled by the packet relay node rather than a destination node.

Technical Solution

The present invention is characterized in that a packet relay node located between a transmitting node (i.e., a source node) and a receiving node (i.e., a destination node) inspects received packets whether they are fragmented packets and reassembles a series of packets decided to be fragmented packets into an original packet.

Additional features of the invention will be set forth in the description which follows, and in part will be apparent from the description, or may be learned by practice of the invention.

Advantageous Effects

According to the present invention, fragmented packets are reassembled by a packet relay node for relaying packets rather than a destination node, thereby reducing overhead and radio resource waste caused by duplicate transmission of IP headers having the same fragmentation information. Furthermore, the fragmented packet reassembly and efficient header compression and transmission in the packet relay node make a reassembly process in a destination node unnecessary, thereby reducing a process load.

BRIEF DESCRIPTION OF THE DRAWINGS

The accompanying drawings, which are included to provide a further understanding of the invention and are incor

MODE FOR THE INVENTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
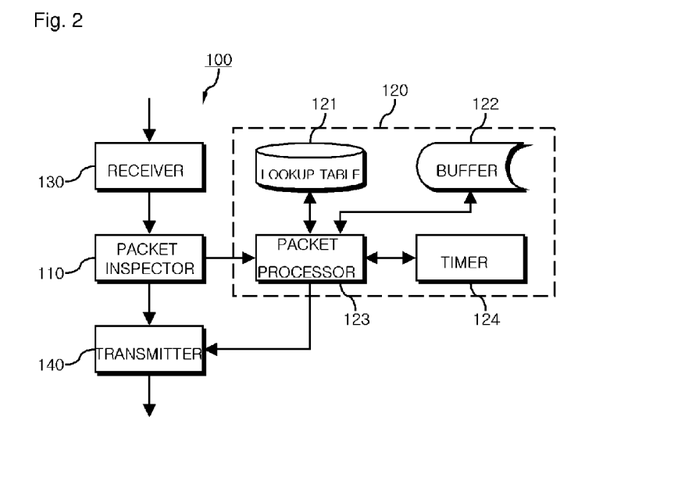
FIG. 2 is a block diagram illustrating a packet reassembly system of a packet relay node according to an exemplary embodiment of the present invention.

FIG. 2 is a block diagram illustrating a packet reassembly system of a packet relay node according to an exemplary embodiment of the present invention. The packet reassembly system 100 of the packet relay node according to an exemplary embodiment of the present invention is implemented by software, hardware or a combination thereof installed in a packet relay node located in a packet domain core network or a radio access network between a transmitting node (i.e., a source node) and a receiving node (i.e., a destination node) for relaying packets. The packet reassembly system 100 includes a packet inspector 110 and a packet assembler 120.

The packet inspector 110 inspects received packets to see whether they are fragmented packets.

The packet assembler 120 reassembles a series of fragmented packets decided to be fragmented packets by the inspector 110, into an original packet.

Each packet from the source node is fragmented into a series of successive packets on an MTU basis as shown in FIG. 1 for efficient transmission. The fragmented packets are ultimately transmitted to the destination node via packet relay nodes located between the source node and the destination node.

In the packet reassembly system 100 of the packet relay node according to an exemplary embodiment of the present invention, when packets are received, the packet inspector 110 inspects the received packets to see if they are fragmented packets, and the packet assembler 120 reassembles a series of packets decided to be fragmented packets by the packet inspector 110, into an original packet.

That is, in a conventional technique, the destination node reassembles fragmented packets while, in the present invention, the packet relay node located between the source node and the destination node reassembles the fragmented packets into an original packet, which is header compressed and transmitted to the destination node, so that the destination node does not have to reassemble the fragmented packets, but need only decompress the compressed header. The header compression refers to efficiently compressing a header of an RTP/UDP/IP, UDP/IP, TCP/IP, or IP packet in order to efficiently use limited radio resources upon packet transmission and reception.

Thus, it is unnecessary to transmit packets each including IP headers having the same fragmentation information to the destination node. This can reduce overhead and radio resource waste caused by duplicate transmission of IP headers having the same fragmentation information. The fragmented-packet reassembly and efficient header compression and transmission in the packet relay node makes a packet reassembly process in the destination node unnecessary, resulting in a reduced process load and accomplishing the aforementioned object of the present invention.

Specifically, the packet assembler 120 includes a lookup table 121, a buffer 122, and a packet processor 123.

The lookup table 121 stores information on fragmented packets. In this case, the fragmented-packet information stored in the lookup table 121 may include identification, a source address, a destination address, a fragment offset, and a More Fragment flag.

The buffer 122 stores the fragmented packets.

The packet processor 123 stores the series of fragmented packets and the series of fragmented-packet information received from the packet inspector 110 in the buffer 122 and the lookup table 121, respectively. The packet processor 123 reassembles the series of fragmented packets from a first fragmented packet to a last fragmented packet, which are stored in the buffer 122, into an original packet by referring to the fragmented-packet information stored in the lookup table 121.

That is, the packet processor 123 stores the series of information on packets decided to be fragmented packets by the packet inspector 110, and the series of fragmented packets, in the lookup table 121 and the buffer 122, respectively.

In this case, the packet processor 123 may recognize where the packet is transmitted from and where the packet is ultimately transmitted to, from the source address and the destination address included in the fragmented-packet information, recognize whether the packet is a last fragmented packet from the More Fragment flag, and recognize a sequence of the series of fragmented packets from the fragment offset.

If the packet processor 123 recognizes from the More Fragment flag that the packet is a last fragmented packet, it recognizes from the fragment offset the sequence of the series of fragmented packets, reassembles the series of fragmented packets from the first fragmented packet to the last fragmented packet according to the sequence in order to obtain an original packet. In this case, the headers, which have been included in the fragmented packets in the transmission process, are all eliminated so that only payloads are reassembled into the original packet.

The resultant original packet is header compressed by header compression protocol such as PDCP and then transmitted to the destination node. Accordingly, the destination node does not have to reassemble the fragmented packets and need only decompress the compressed header.

The header compression refers to efficiently compressing a packet header of a RTP/UDP/IP, UDP/IP, TCP/IP, or IP packet to efficiently use limited radio resources upon packet transmission and reception.

In this case, the packet reassembly system 100 of the packet relay node according to an exemplary embodiment of the present invention may be implemented so that the header compression is performed by the PDCP protocol or by the system itself. Alternatively, the packet reassembly system 100 of the packet relay node according to an exemplary embodiment of the present invention may only reassemble and output the packets and another device may perform the header compression.

Thus, according to the present invention, it is unnecessary to transmit packets including IP headers having the same fragmentation information to the destination node, thereby reducing overhead and radio resource waste caused by duplicate transmission of the IP headers having the same fragmentation information. Furthermore, the fragmented-packet reassembly and efficient header compression and transmission in the packet relay node makes the packet reassembly process in the destination node unnecessary, resulting in reduced process load.

Meanwhile, according to further aspects of the present invention, the packet processor 123 may delete all relevant fragmented packets from the buffer 122 and all relevant fragmented-packet information from the lookup table 121 when a last fragmented packet is not received within a time set to guarantee quality of service (QoS) of a bearer.

In this case, the packet assembler 120 may further include a timer 124 for checking the time set to guarantee QoS.

That is, in the present exemplary embodiment, even though a packet lost in the packet transmission process is transmitted to the destination node, it will ultimately be discarded in the destination node. The packet reassembly system 100 of the packet relay node according to an exemplary embodiment of the present invention pre-checks if a packet is lost in the packet transmission process and, when the packet is lost, discards relevant fragmented packets, such that the lost packet is not transmitted to the destination node, resulting in reduced radio resource waste and process load.

For this, when the first fragmented packet is received, the packet processor 123 activates the timer 124 to perform monitoring to see if the last fragmented packet is received within the time set to guarantee QoS. If the last fragmented packet is not received within the set time, the packet processor 123 deletes all relevant fragmented packets from the buffer and relevant fragmented-packet information from the lookup table to discard the packet lost in the packet transmission process.

Meanwhile, according to further aspects of the present invention, the packet reassembly system 100 of the packet relay node according to an exemplary embodiment of the present invention may further include a receiver 130 and a transmitter 140. The receiver 130 receives packets, and the transmitter 140 transmits the original packet obtained by the packet assembler 120.

That is, in the present exemplary embodiment, the receiver 130 for receiving the fragmented packets from a preceding node on the packet transmission path, and the transmitter 140 for transmitting the original packet obtained by reassemble of a series of fragmented packets to a succeeding node on the packet transmission path are integrally configured in the packet reassembly system 100 of the packet relay node according to an exemplary embodiment of the present invention.

Meanwhile, according to further aspects of the present invention, the transmitter 140 may compress a header of the original packet obtained by the packet assembler 120 and transmit the resultant packet.

That is, in the present exemplary embodiment, the packet reassembly system 100 of the packet relay node itself performs the header compression on the original packet obtained through the reassembly. The transmitter 140 compresses a header of the original packet using header compression protocol, such as PDCP, and transmits the resultant packet. Accordingly, the destination node does not have to reassemble the fragmented packets and need only decompress the compressed header, resulting in reduced radio resource waste and process load.

Alternatively, the packet reassembly system 100 of the packet relay node according to an exemplary embodiment of the present invention may only reassemble and output packets without performing the header compression and a succeeding node on the packet transmission path may compress the header of the packet and output the resultant packet to the destination node.

Examples in which the packet reassembly system 100 of the packet relay node according exemplary embodiments of the present invention is implemented based on a 3rd Generation Partnership Project (3GPP) including a PDCP, which is radio access protocol for header compression, will now be described with reference to FIGS. 3 to 8.

(An Example Implemented in Universal Mobile Telecommunications System (UMTS))

Figure 3:
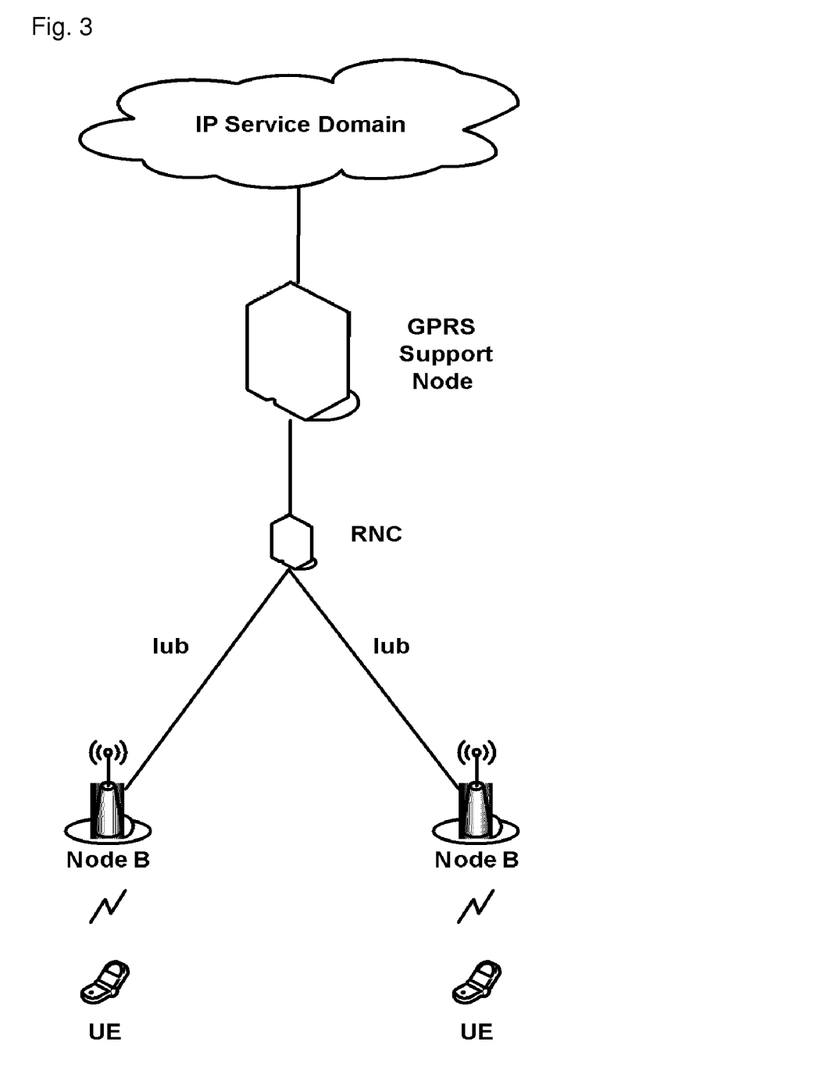
FIG. 3 is a schematic diagram illustrating a Universal Mobile Telecommunications System (UMTS).

FIG. 3 is a schematic diagram illustrating a UMTS. The 3GPP UMTS is a 3rd generation asynchronous mobile communication system using Wideband Code Division Multiple Access (WCDMA), and employs General Packet Radio Service (GPRS) for packet domain service.

A network constituting the UMTS consists of a GPRS network for providing IP domain service, which is a core network for connection to a foreign network through a packet domain, and a Universal Terrestrial Radio Access Network (UTRAN). A User Equipment (UE) receives 3rd generation service including voice, data, and image by accessing the UMTS via network elements of these networks.

Network elements of the UTRAN, which performs radio resource control for a UE, transmission and data processing via a radio access interface include a Radio Network Controller (RNC) for managing and controlling the radio resources, and a group of one or more Node Bs for performing radio transmission and reception between UEs and match between RNCs in a cell.

Node B of the UTRAN provides a transmission and reception interface Uu of a radio channel that enables the UE to access the UMTS for transmission and reception. For this, Node B includes a physical (PHY) layer and a dedicated Medium Access Control (MAC) layer for High Speed Packet Access (HSPA) service, if necessary.

To perform control and management, such as allocation and release of radio resources to a UE, and user data transmission, the RNC includes respective entities of a MAC layer, an RLC layer for controlling a radio link, and a PDCP layer for transmitting and receiving user packet data to allow packet transmission and reception between radio access interfaces.

Figure 4:
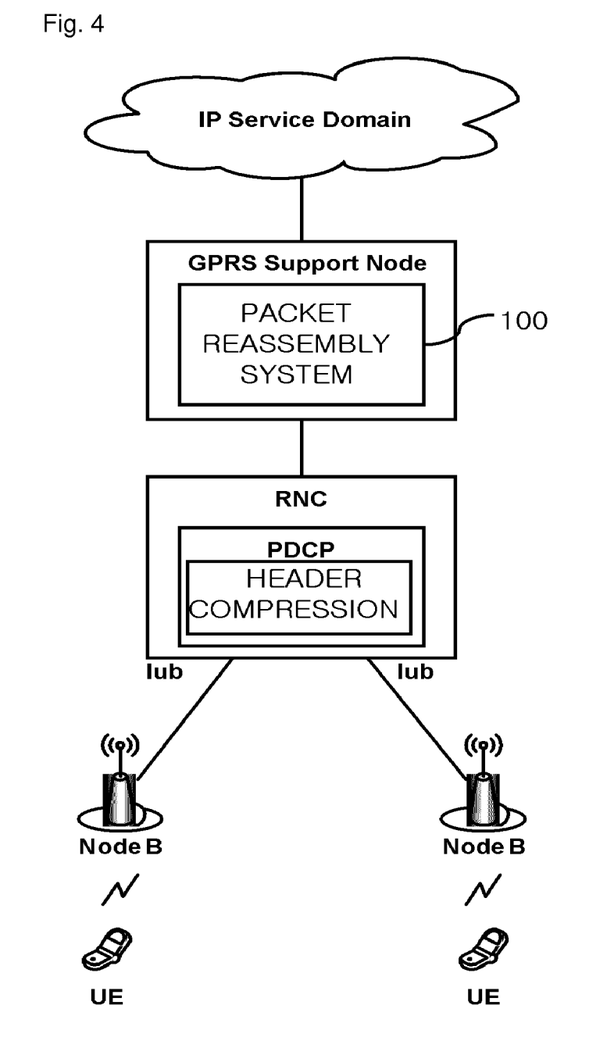
FIG. 4 illustrates an example in which a packet reassembly system of a packet relay node according to the present invention is implemented in a GPRS Support Node (GSN) of a UMTS.

FIG. 4 illustrates an example in which the packet reassembly system 100 of the packet relay node according to the present invention is implemented in a GPRS Support Node (GSN) of a UMTS according to an exemplary embodiment of the present invention.

In the present exemplary embodiment, the GSN of the UMTS has a fragmented-packet reassembly function in the packet reassembly system 100 of the packet relay node, and an RNC has a reassembled-packet header compression function.

That is, the GSN of the UMTS reassembles received fragmented packets and transmits the resultant packet to the RNC, and the RNC performs header compression on the reassembled packet and transmits the resultant packet to a destination node, which is a user equipment (UE).

The UE then decompresses the compressed header to recover the packet. Accordingly, the UE as the destination node does not have to reassemble the fragmented packets, thereby reducing overhead and radio resource waste caused by duplicate transmission of IP headers having the same fragmentation information, and reducing UE process load.

Figure 5:
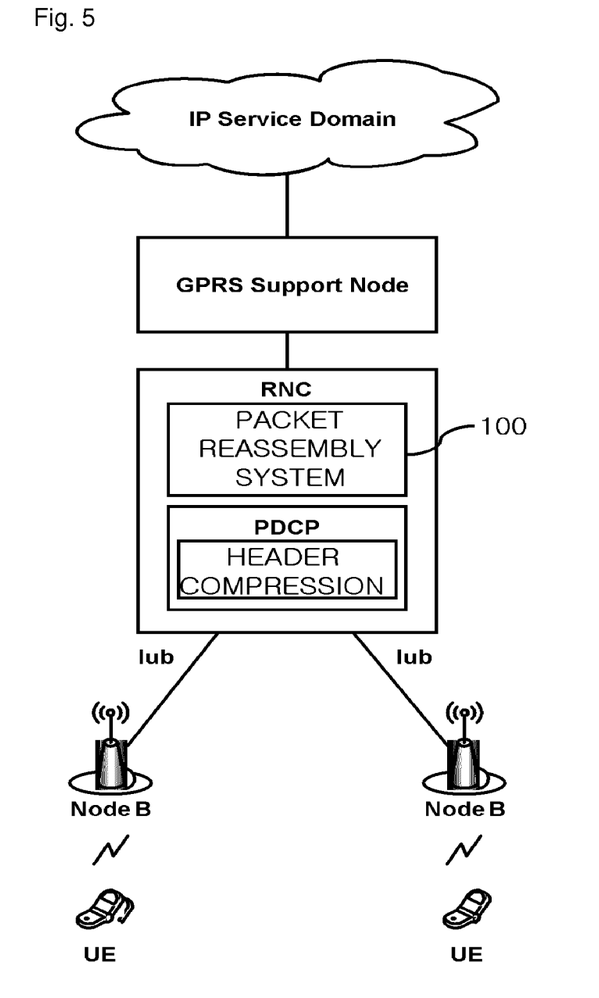
FIG. 5 illustrates an example in which a packet reassembly system of a packet relay node according to an exemplary embodiment of the present invention is implemented in a Radio Network Controller (RNC) of a UMTS.

FIG. 5 illustrates an example in which the packet reassembly system 100 of the packet relay node according to an exemplary embodiment of the present invention is implemented in an RNC of a UMTS.

In this exemplary embodiment, the RNC of the UMTS has both a fragmented-packet reassembly function and a reassembled-packet header compression function in the packet reassembly system 100 of the packet relay node according to the present invention.

That is, the RNC of the UMTS reassembles received fragmented packets, compresses a header of the packet obtained through the reassembly, and transmits the resultant packet to a UE, which is a destination node.

The UE then decompresses the compressed header to recover a packet. Thus, the UE that is a destination node does not reassemble the fragmented packets, thereby reducing overhead and radio resource waste caused by duplicate transmission of IP headers having the same fragmentation information, and reducing a UE process load.

(An Example Implemented by Long Term Evolution (LTE) System)

Figure 6:
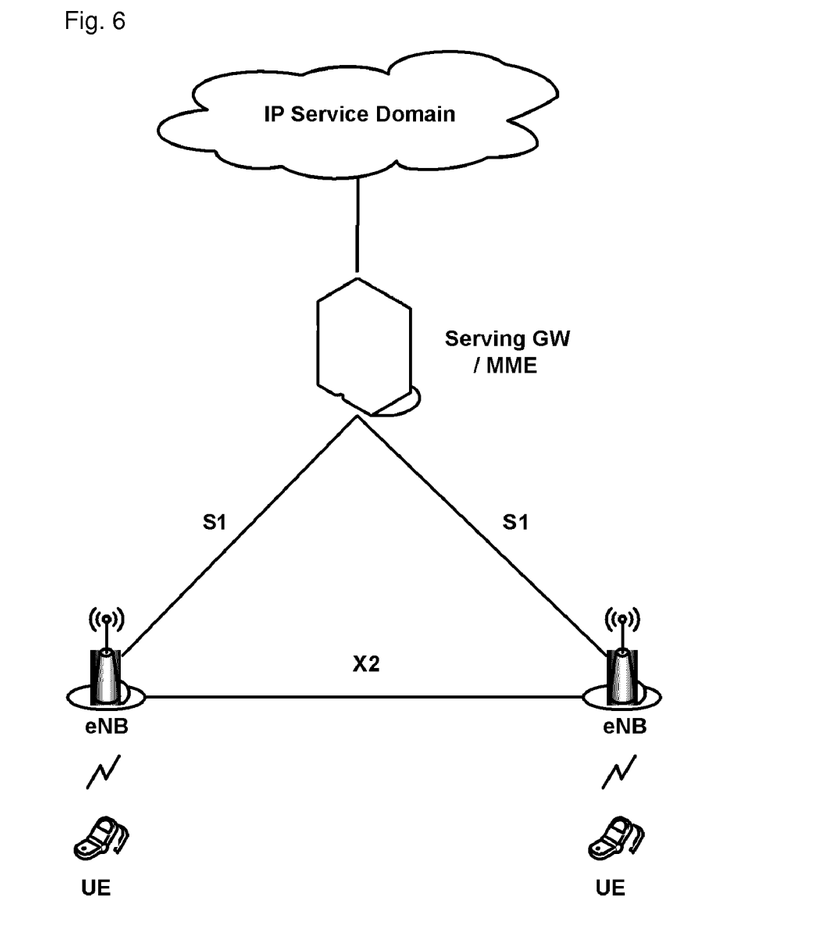
FIG. 6 is a schematic diagram illustrating a Long Term Evolution (LTE) system.

FIG. 6 is a schematic diagram illustrating an LTE system. The LTE system is a new version of a packet-based UMTS, including evolved UTRA and Universal Terrestrial Radio Access Network (UTRAN), that is an asynchronous mobile communication system. The LTE system guarantees a round-trip time as low as 10 ms or less, a downlink data rate as high as 100 Mbps, and an uplink data rate as high as 50 Mbps, and uses a packet switched network rather than an existing circuit switched network with low efficiency of network resources, so that a Packet Data Network (PDN) and a UE easily cooperate with each other. Radio access technology has been standardized.

In particular, a network constituting the LTE system is a combination of an Evolved Packet Core (EPC) network for connecting a radio access network to a foreign network and an Evolved Universal Terrestrial Radio Access Network (EUTRAN). The UE can receive high-speed IP-based service by accessing the LTE system via nodes of these networks. Here, the combination of the EPC and the EUTRAN is made via an S1 interface, and a combination between the eNBs in the EUTRAN is made in a meshed network structure via an X2 interface.

Network elements of the EPC network include a system architecture evolution access gateway having a gateway function for a connection between an IP-based wired network and a radio access network, packet routing and forwarding, and a connection to an external PDN; and a Mobility Management Entity (MME) for performing UE mobility management and UE authentication, bearer and session management, and Non-Access Stratum (NAS) signaling control.

The access gateway includes a PDN gateway having a gateway function for the connection to the external PDN, and a serving gateway for performing an IP-based connection between a radio access network and a wired network through match with the LTE system, and packet routing and forwarding.

Network elements of the EUTRAN network include eNB nodes for providing a radio access interface for radio transmission and reception between UEs in one or more cells, and performing radio resource management and control, and data transmission and processing through radio transmission and reception between the UEs. The eNB performs a radio access function incorporating original functions of an RNC in a UTRAN, which is a radio access network for an existing 3rd generation UMTS, and a Node B.

Here, the eNB and the UE include a PDCP layer for transmitting and receiving user packet data for packet transmission and reception between radio access interfaces, an RLC for performing radio link control, and a Medium Access Control (MAC) layer.

In the LTE system, the eNB includes radio protocols for PDCP, RLC, MAC, and
PHY layers for performing, for example, header compression, ciphering, packet scheduling, Automatic Repeat Request (ARQ), and Hybrid ARQ (HARM) functions.

In particular, the PDCP entity of the PDCP layer performs, on user-plane data, header compression, transmission of user data between an upper Non-Access Stratum (NAS) layer and a lower RLC layer, sequential delivery of upper layer data in handover, duplication detection for lower layer data, and ciphering; and on control plane data, ciphering and integrity protection, and transmission and reception of control-plane data between an upper RRC layer and a lower RLC layer.

Figure 7:
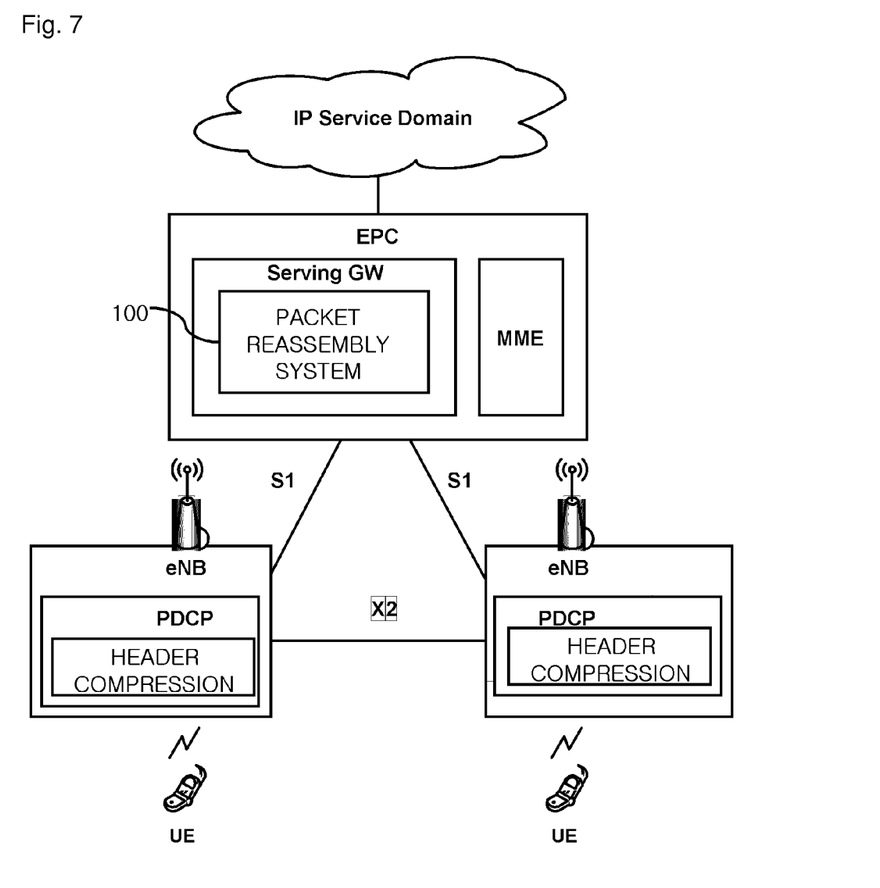
FIG. 7 illustrates an example in which a packet reassembly system of a packet relay node according to an exemplary embodiment of the present invention is implemented in a serving gateway of an LTE system.

FIG. 7 illustrates an example in which the packet reassembly system 100 of the packet relay node according to an exemplary embodiment of the present invention is implemented in a serving gateway (serving GW) of the LTE system.

In the present exemplary embodiment, the serving GW of the LTE system has a fragmented-packet reassembly function in the packet reassembly system 100 of the packet relay node according to an exemplary embodiment of the present invention, and the eNB has a reassembled-packet header compression function.

That is, the serving GW of the LTE system reassembles received fragmented packets and transmits the resultant packet to the eNB, and the eNB compresses a header of the packet and transmits the resultant packet to a UE, which is a destination node.

The UE then decompresses the compressed header to recover a packet. Accordingly, the UE, which is the destination node, does not have to reassemble the fragmented packets, thereby reducing overhead and radio resource waste caused by duplicate transmission of IP headers having the same fragmentation information, and reducing a UE process load.

Figure 8:
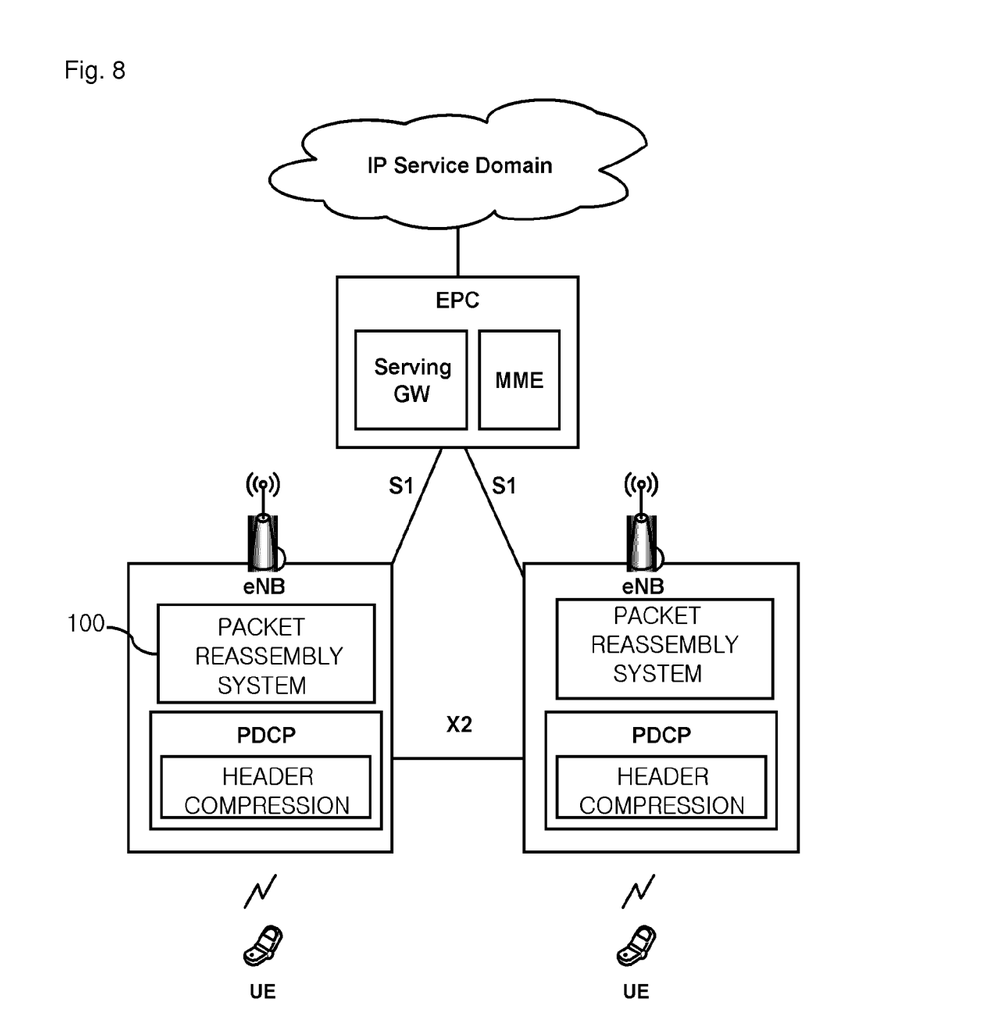
FIG. 8 illustrates an example in which a packet reassembly system of a packet relay node according to an exemplary embodiment of the present invention is implemented in an enhanced Node B (eNB) of an LTE system.

FIG. 8 illustrates an example in which the packet reassembly system 100 of the packet relay node according to an exemplary embodiment of the present invention is implemented in an eNB of an LTE system.

In the present exemplary embodiment, the eNB of the LTE system has a fragmented-packet reassembly function and a reassembled-packet header compression function in the packet reassembly system 100 of the packet relay node.

That is, the eNB of the LTE system reassembles received fragmented packets, and compresses and transmits a header of the resultant packet to a UE, which is a destination node.

The UE then decompresses the compressed header to recover the packet. Accordingly, the UE, which is a destination node, does not reassemble the fragmented packets, thereby reducing overhead and radio resource waste caused by duplicate transmission of IP headers having the same fragmentation information, and reducing a UE process load.

Figure 9:
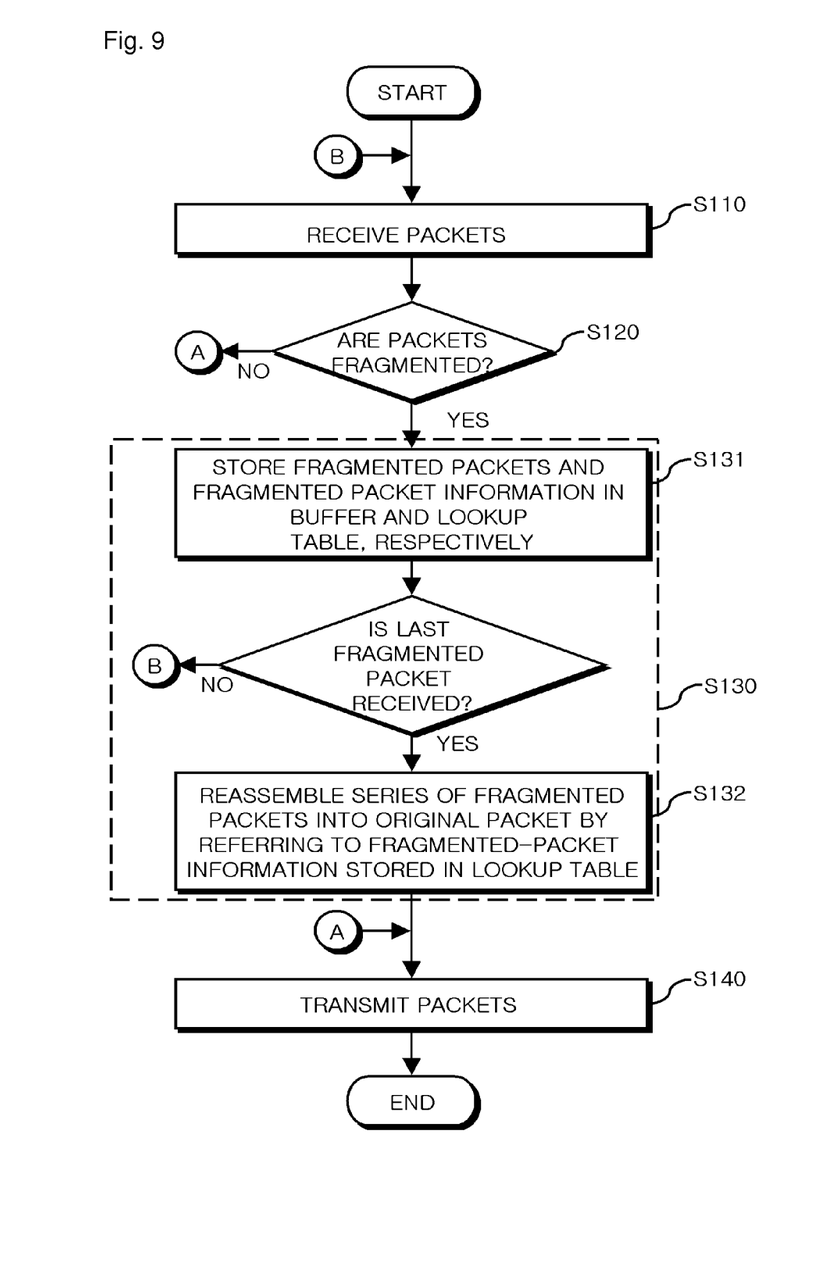
FIG. 9 is a flowchart illustrating operation of reassembling fragmented packets in a packet reassembly system of a packet relay node according to an exemplary embodiment of the present invention.

An operation of reassembling fragmented packets in a packet reassembly system of a packet relay node according to the present invention will now be described with reference to FIG. 9. FIG. 9 is a flowchart illustrating operation of reassembling fragmented packets in a packet reassembly system of a packet relay node according to an exemplary embodiment of the present invention.

First, when packets are transmitted to the packet relay node, which is located on a packet domain core network or a radio access network between a source node and a destination node for relaying packets, the packet reassembly system of the packet relay node according to the present invention receives the packets in operation S110.

In this case, the packet relay node may be a GSN or an RNC of the UMTS, or may be a serving gateway or an eNB of an LTE system.

The packet reassembly system of the packet relay node according to the present invention inspects the received packets to see if they are fragmented packets in operation S120.

If it is decided in operation S120 that the received packets are not fragmented ones, the process directly proceeds to operation S140, and if the received packets are fragmented ones, the packet reassembly system of the packet relay node according to the present invention reassembles a series of fragmented packets into an original packet in operation S130.

Specifically, first, the packet reassembly system of the packet relay node stores the fragmented packets and fragmented-packet information in the buffer and the lookup table, respectively, in operation S131.

In this case, the fragmented-packet information may include identification, a source address, a destination address, a fragment offset, and a More Fragment flag.

When a last fragmented packet is received, the packet reassembly system of the packet relay node reassembles a series of fragmented packets from a first fragmented packet to the last fragmented packet stored in the buffer into an original packet by referring to the fragmented-packet information stored in the lookup table in operation S132.

In operation S130, the system may delete all relevant fragmented packets from the buffer and relevant fragmented-packet information from the lookup table when the last fragmented packet is not received within a time set to guarantee QoS of a bearer.

The packet reassembly system of the packet relay node according to the present invention then transmits the original packet in operation S140. In operation S140, the original packet may be header compressed for transmission.

The header compressed packet is transmitted to the destination node, which decompresses the compressed header to recover the packet. As a result, the destination node does not reassemble the fragmented packets, which can reduce overhead and radio resource waste caused by duplicate transmission of IP headers having the same fragmentation information and reduce a UE process load, thus accomplishing the aforementioned object of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Industrial Applicability

The present invention can be efficiently applied to the field of packet processing in a packet relay node between a source node and a destination node, and of applications thereof.

The invention claimed is:

1. A system for reassembling packets in a packet relay node, comprising:
   a packet inspector for determining whether received packets are fragmented packets;
   a packet assembler for reassembling a series of packets determined to be fragmented packets into an original packet
   a lookup table for storing fragmented-packet information;
   a buffer for storing the fragmented packets; and
   a packet processor for storing the series of fragmented packets and a series of information on fragmented-packet information received from the packet inspector in the buffer and the lookup table, respectively, and reassembling the series of fragmented packets from a first fragmented packet to a last fragmented packet stored in the buffer into the original packet by referring to the fragmented-packet information stored in the lookup table,
   wherein the packet assembler reassembles corresponding fragmented packets into the original packet so as to delete fragmented-packet information such that the reassembled original packet does not include the deleted fragmented-packet information,
   wherein the packet processor associates the series of fragmented packets which are stored in the buffer and which correspond to the original packet based on the fragmented-packet information, and
   wherein the fragmented-packet information includes a source address, a destination address corresponding to an end destination to which the original packet is to be ultimately transmitted, an indication as to whether each of the respective fragmented packets corresponds to a last fragmented packet for the series of fragmented packets corresponding to the original packet, and sequential information indicating a sequence of the series of packets corresponding to the original packet.

2. The system of claim 1, wherein the packet processor deletes all relevant fragmented packets from the buffer and relevant fragmented-packet information from the lookup table when the last fragmented packet is not received within a time set to guarantee Quality of Service (QoS) of a bearer.

3. The system of claim 2, wherein the packet assembler further comprises a timer for checking the time set to guarantee QoS.

4. The system of claim 1, further comprising:
   a receiver for receiving the packets; and
   a transmitter for transmitting the original packet obtained by the packet assembler.

5. The system of claim 4, wherein the transmitter performs header compression on the original packet obtained by the packet assembler and transmits the resultant packet.

6. The system of claim 1, wherein the packet relay node is a GPRS Support Node (GSN) of a Universal Mobile Telecommunications System (UMTS.).

7. The system of claim 1, wherein the packet relay node is an Radio Network Controller (RNC) of a UMTS.

8. The system of claim 1, wherein the packet relay node is a serving gateway of a Long Term Evolution (LTE) system.

9. The system of claim 1, wherein the packet relay node is an enhanced Node B (eNB) of an LTE system.

10. A method for reassembling packets in a packet relay node, comprising:
receiving packets;
determining whether the received packets are fragmented;
reassembling a series of packets determined to be fragmented packets into an original packet; and
transmitting the original packet,
wherein corresponding fragmented packets are reassembled into the original packet so as to delete fragmented-packet information such that the reassembled original packet does not include the fragmented-packet information,
wherein the reassembling of the series of packets comprises:
storing a series of packets decided to be fragmented packets and fragmented-packet information in a buffer and a lookup table, respectively;
associating the series of fragmented packets which are stored in the buffer and which correspond to the original packet based on the fragmented-packet information; and
when a last fragmented packet is received, reassembling a series of fragmented packets from a first fragmented packet to the last fragmented packet stored in the buffer into an original packet by referring to the fragmented-packet information stored in the lookup table, and
wherein the fragmented-packet information includes a source address, a destination address corresponding to an end destination to which the original packet is to be ultimately transmitted, an indication as to whether each of the respective fragmented packets corresponds to a last fragmented packet for the series of fragmented packets corresponding to the original packet, and sequential information indicating a sequence of the series of packets corresponding to the original packet.

11. The method of claimer 10, wherein the reassembling of the series of packets comprises deleting all relevant fragmented packets from the buffer and relevant fragmented-packet information from the lookup table when the last fragmented packet is not received within a time set to guarantee QoS of a bearer.

12. The method of claim 10, wherein the transmitting of the original packet comprises performing header compression on the original packet and transmitting the resultant packet.

13. The method of claim 10, wherein the packet relay node is a GSN of a UMTS.

14. The method of claim 10, wherein the packet relay node is an RNC of a UMTS.

15. The method of claim 10, wherein the packet relay node is a serving gateway of an LTE system.

16. The method of claim 10, wherein the packet relay node is an eNB of an LTE system.

17. The method of claim 12, wherein the header compression of a header of the original packet is initiated after the series of fragmented packets have been reassembled into the original packet.

* * * * *